US008002863B2

(12) United States Patent
Kubo et al.

(10) Patent No.: US 8,002,863 B2
(45) Date of Patent: Aug. 23, 2011

(54) ENGINE AIR CLEANER AND DEVICE FOR MOUNTING AIR CLEANER ON ENGINE

(75) Inventors: Yoshihiko Kubo, Wako (JP); Shingo Yoneda, Wako (JP); Kazuhiro Sakamoto, Wako (JP); Yasunori Matsubara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 620 days.

(21) Appl. No.: 11/919,556

(22) PCT Filed: Jun. 23, 2006

(86) PCT No.: PCT/JP2006/312607

§ 371 (c)(1), (2), (4) Date: Sep. 4, 2008

(87) PCT Pub. No.: WO2006/137518

PCT Pub. Date: Dec. 28, 2006

(65) Prior Publication Data

US 2009/0183709 A1 Jul. 23, 2009

(30) Foreign Application Priority Data

Jun. 23, 2005 (JP) ................................ 2005-183594
Jun. 23, 2005 (JP) ................................ 2005-183599
Jun. 23, 2005 (JP) ................................ 2005-183600

(51) Int. Cl.
*B01D 50/00* (2006.01)

(52) U.S. Cl. ............ 55/385.3; 55/498; 55/410; 55/418; 123/198 E

(58) Field of Classification Search ................ 55/385.3, 55/481, 493, 498, 497, 500, 502, 503; 123/198 E
See application file for complete search history.

(56) References Cited

U.S. PATENT DOCUMENTS

| | | | | |
|---|---|---|---|---|
| 2,417,130 | A | 3/1947 | Russell | |
| 2,589,111 | A | 3/1952 | Mills | |
| 5,233,967 | A | 8/1993 | Peller | |
| 5,487,767 | A | 1/1996 | Brown | |
| 5,554,205 | A * | 9/1996 | Ernst et al. | 55/385.3 |
| 5,640,937 | A * | 6/1997 | Slopsema | 123/198 E |
| 5,655,497 | A * | 8/1997 | Nakajima | 123/198 E |
| 5,937,816 | A | 8/1999 | Wincewicz et al. | |

(Continued)

FOREIGN PATENT DOCUMENTS

GB 1 053 111 A 12/1966

(Continued)

*Primary Examiner* — Duane Smith
*Assistant Examiner* — Minh-Chau Pham
(74) *Attorney, Agent, or Firm* — Arent Fox LLP

(57) ABSTRACT

An engine air cleaner includes a cleaner element unit is housed within the upper cover body, and a skirt wall of the upper cover body extends further downward than the suction opening. A seal packing and the cleaner element unit are superimposed and fitted onto an outer periphery of an intake passage within the cleaner cover body. The seal packing is provided with a retaining projection that is tightly engaged with the intake passage. An air cleaner is disposed to be side by side with one side of the engine, a lower part of the cleaner cover body is joined integrally to and supported on the engine together with a carburetor via a pair of connecting bolts, and a reinforcing vertical wall portion of the cleaner cover body facing the engine across a gap is joined integrally to and supported on the engine via another connecting bolt.

13 Claims, 17 Drawing Sheets

U.S. PATENT DOCUMENTS

| | | | | |
|---|---|---|---|---|
| 6,402,798 | B1 * | 6/2002 | Kallsen et al. | 55/385.3 |
| 7,473,292 | B2 * | 1/2009 | Moriyama et al. | 55/502 |
| 7,695,539 | B2 * | 4/2010 | Waibel | 55/502 |
| 2003/0051453 | A1 * | 3/2003 | Moreau et al. | 55/385.3 |
| 2005/0060973 | A1 | 3/2005 | Yuasa et al. | |
| 2005/0085142 | A1 | 4/2005 | Miura et al. | |
| 2008/0282654 | A1 * | 11/2008 | Matschl et al. | 55/385.3 |
| 2009/0126678 | A1 * | 5/2009 | Takeuchi et al. | 123/198 E |

FOREIGN PATENT DOCUMENTS

| | | | |
|---|---|---|---|
| GB | 2 011 273 | A | 7/1979 |
| GB | 2 274 408 | A | 7/1994 |
| GB | 2 293 335 | A | 3/1996 |
| JP | 54-66012 | | 10/1977 |
| JP | 55-102061 | | 1/1979 |
| JP | 59-62263 | U | 4/1984 |
| JP | 59-103857 | U | 7/1984 |
| JP | 60-170056 | U | 11/1985 |
| JP | 63-11322 | Y2 | 4/1988 |
| JP | 1-78258 | U | 5/1989 |
| JP | 4-137252 | U | 12/1992 |
| JP | 04-137252 | U | 12/1992 |
| JP | 07-119566 | A | 5/1995 |
| JP | 2003-214269 | A | 7/2003 |
| JP | 2004-138008 | A | 5/2004 |
| WO | WO 91/13675 | A1 | 9/1991 |

* cited by examiner

ENGINE AIR CLEANER AND DEVICE FOR MOUNTING AIR CLEANER ON ENGINE

CROSS-REFERENCE TO RELATED APPLICATION

This application is a National Stage entry of International Application No. PCT/JP2006/312607, filed Jun. 23, 2006, the entire specification, claims, and drawings of which are incorporated herewith by reference.

TECHNICAL FIELD

The present invention relates to an air cleaner that prevents raindrops running down an outer face of a cleaner cover body provided on an engine, particularly a general purpose engine, from being sucked therein, and that prevents outside air that has been taken in from being taken into the engine side without being cleaned. Also, the present invention relates to a device for mounting an air cleaner on an engine, in order to clean and guide outside air into an engine, particularly a general purpose engine.

BACKGROUND ART

Since generally an engine-driven work machine is often used outdoors and an air cleaner connected to an air intake system of the engine is exposed to the atmosphere, a disadvantage can be expected that raindrops running down on an outer wall of a cleaner cover body are sucked into the air cleaner upon receiving an intake negative pressure of the engine.

A conventional arrangement is known in which an air cleaner is provided with a rain cap for preventing rainwater from entering the interior of the air cleaner (see Patent Publication 1 for example).

Further, a conventional general purpose engine air cleaner is known in which a joining tube (air intake tube) is provided on a base plate blocking an opening in a lower face of a cover case, an air cleaner element is fitted to the joining tube, and a packing is disposed between the air cleaner element and the base plate, so that outside air containing dirt does not leak directly toward the engine side without passing through the air cleaner element (see Patent Publication 2 for example).

Furthermore, a conventional arrangement of a general purpose engine is known in which an air cleaner for taking in outside air, cleaning it, and then guiding it to the engine is integrally supported on one side of a cylinder part of the engine by means of a securing member such as a bolt (see Patent Publication 3 for example).

Patent Publication 1: Japanese Utility Model Registration Publication No. 63-11322

Patent Publication 2: Microfilm of Japanese Utility Model Registration Application Laid-open No. 1-78258

Patent Publication 3: Japanese Utility Model Registration Publication No. 59-62263

DISCLOSURE OF INVENTION

Problems to be Solved by the Invention

However, the arrangement disclosed in Patent Publication 1 has a complicated structure in which a conical inclined face is provided on the rain cap provided on the air cleaner, a large number of specially-shaped suction openings are bored in the conical inclined face, and a peripheral wall is provided around the suction openings. Therefore, not only is the cost high, but there is also a problem that when the flow rate of intake air is high, the arrangement is inadequate as a measure against raindrops being sucked in.

Further, in the arrangement disclosed by Patent Publication 2, when the air cleaner element is detached from the joining tube for maintenance, etc., such as replacement or cleaning, the packing might be detached together with the air cleaner element in intimate contact therebetween, leading to another problem that reassembly of the packing is forgotten or the packing is lost.

Furthermore, generally in the general purpose engine, since the outside air that has been cleaned by the air cleaner is appropriately mixed with fuel in a carburetor supported on the engine, and the gas mixture is then supplied to the engine, the air cleaner is supported on the engine via the carburetor in an overhanging state at a position distant from the engine, leading to a problem that it is difficult to guarantee rigidity for supporting the air cleaner. Moreover, if the capacity of a cleaner chamber is increased in order to enhance the performance of the air cleaner, the cleaner cover becomes large and the above-mentioned problem becomes more significant, resulting in a case where the cleaner cover is required to be detached beforehand in order to secure the air cleaner to the engine, thus providing another problem that the efficiency of securing the air cleaner to the engine is degraded.

The present invention has been accomplished under the above-mentioned circumstances, and it is an object thereof to provide a novel engine air cleaner and a device for mounting the air cleaner on an engine that can solve all the above-mentioned problems.

Means for Solving the Problems

In order to achieve the above object, according to a first feature of the present invention, there is provided an engine air cleaner comprising a cleaner cover body provided with a suction opening communicating with outside air and a discharge opening communicating with an intake port of an engine, and a cleaner element unit for cleaning the outside air sucked in via the suction opening, the cleaner element unit being housed within the cleaner cover body, characterized in that a skirt wall of the cleaner cover body surrounding the suction opening in the vicinity of the suction opening extends further downward than the suction opening.

In order to achieve the above object, according to a second feature of the present invention, in addition to the first feature, a shielding wall is provided between the suction opening and the skirt wall, the skirt wall and the shielding wall facing each other across a gap and forming a double wall that extends further downward than the suction opening.

In order to achieve the above object, according to a third feature of the present invention, in addition to the first or second feature, the shielding wall is provided along an outer open edge of the suction opening so as to be arranged side by side with the skirt wall, extends in a direction away from the suction opening, and is curved so as to cover the suction opening from opposite sides.

In order to achieve the above object, according to a fourth feature of the present invention, in addition to any one of the first, second and third features, the suction opening has a widening portion that widens relative to a center of the suction opening toward the middle of the cleaner cover body, an intake tube extending upward toward the interior of the cleaner cover body is connected integrally to the suction opening, and the intake tube is gradually narrowed from an entrance on the suction opening side to an exit at the upper end of the intake tube.

In order to achieve the above object, according to a fifth feature of the present invention, there is provided an engine air cleaner comprising a cleaner cover body provided with a suction opening communicating with outside air and a discharge opening communicating with an intake port of an engine, and a cleaner element unit for cleaning the outside air sucked in via the suction opening, the cleaner element unit being housed within the cleaner cover body, characterized in that an intake passage is provided within the cleaner cover body, the intake passage providing communication between the suction opening and the discharge opening provided in the cleaner cover body; a seal packing and the cleaner element unit are superimposed and fitted onto an outer periphery of the intake passage; outside air taken in through the suction opening is cleaned by the cleaner element unit and then discharged into the discharge opening; the seal packing preventing outside air from leaking directly to the discharge opening; and the seal packing is provided with a retaining member that is tightly engaged with the cleaner cover body so as to prevent the seal packing from being unintentionally detached from the intake passage.

In order to achieve the above object, according to a sixth feature of the present invention, there is provided an engine air cleaner comprising a cleaner cover body provided with a suction opening communicating with outside air and a discharge opening communicating with an intake port of an engine, and a cleaner element unit for cleaning the outside air sucked in via the suction opening, the cleaner element unit being housed within the cleaner cover body, characterized in that the cleaner cover body is formed from an upper cover body and a lower cover body fixed to a lower part of the upper cover body; an intake passage is provided in a dividing wall provided on the lower cover body, the intake passage providing communication between the suction opening provided in the upper cover body and the discharge opening provided in the lower cover body; a seal packing and the cleaner element unit are superimposed and fitted onto an outer periphery of the intake passage; outside air taken in through the suction opening is cleaned by the cleaner element unit and then discharged into the discharge opening, the seal packing being held between the cleaner element unit and the dividing wall so as to prevent outside air from leaking directly to the discharge opening; and the seal packing is provided with a retaining member that is tightly engaged with the lower cover body so as to prevent the seal packing from being unintentionally detached from the intake passage.

In order to achieve the above object, according to a seventh feature of the present invention, in addition to the fifth or sixth feature, the retaining member of the seal packing is tightly engaged with the outer periphery of the intake passage.

In order to achieve the above object, according to an eighth feature of the present invention, in addition to the sixth feature, the retaining member of the seal packing is tightly engaged with a channel formed in the dividing wall.

In order to achieve the above object, according to a ninth feature of the present invention, in addition to any one of the fifth, sixth, seventh and eighth features, the retaining member is formed on a face other than a seal face of the seal packing.

In order to achieve the above object, according to a tenth feature of the present invention, there is provided a device for mounting, on an engine, an engine air cleaner comprising a cleaner cover body provided with a suction opening communicating with outside air and a discharge opening communicating with an intake port of an engine, and a cleaner element unit for cleaning the outside air sucked in via the suction opening, the cleaner element unit being housed within the cleaner cover body, characterized in that the air cleaner is disposed so as to be side by side with one side of the engine; a lower part of the cleaner cover body forming an outer shell of the air cleaner is joined integrally to and supported on the engine together with a carburetor via a pair of securing members; and a reinforcing vertical wall portion of the cleaner cover body facing the engine across a gap is joined integrally to and supported on the engine via another securing member.

In order to achieve the above object, according to an eleventh feature of the present invention, there is provided a device for mounting, on an engine, an engine air cleaner comprising a cleaner cover body provided with a suction opening communicating with outside air and a discharge opening communicating with an intake port of an engine, and a cleaner element unit for cleaning the outside air sucked in via the suction opening, the cleaner element unit being housed within the cleaner cover body, characterized in that the air cleaner is disposed so as to be side by side with one side of the engine; the cleaner cover body forming an outer shell of the air cleaner is formed by integrally connecting an upper cover and a lower cover body, the cleaner element unit for cleaning outside air that has been fed in being disposed in the upper cover and the lower cover body forming an intake duct for guiding cleaned outside air to the engine; a dividing wall is formed integrally with an upper face of the lower cover body, the dividing wall dividing the upper cover body and the lower cover body and reinforcing an upper part of the lower cover body; the lower cover body has its lower part joined integrally to and supported on the engine together with a carburetor via a pair of securing members; and a reinforcing vertical wall portion, in the vicinity of the dividing wall, of an upper part of the lower cover body is joined integrally to and supported on the engine via another securing member.

In order to achieve the above object, according to a twelfth feature of the present invention, in addition to the eleventh feature, a boss having a hollow cylindrical hole extending toward the engine is formed integrally with the reinforcing vertical wall portion of the lower cover body; and said other securing member fixed to the engine runs through and is fixed to the hollow cylindrical hole of the lower cover body.

In order to achieve the above object, according to a thirteenth feature of the present invention, in addition to any one of the tenth, eleventh and twelfth features, all of said pair of securing members and said other securing member are connecting bolts, their central axes are substantially parallel to each other, and all of these connecting bolts can be operated from outside the cleaner cover body.

Effects of the Invention

In accordance with the first to the fourth features of the present invention, merely making a slight modification to a conventional air cleaner can prevent water droplets such as raindrops running down the outer face of the cleaner cover body from entering the interior of the air cleaner through the suction opening.

Particularly with the second and third features, making water droplets such as raindrops collide with the shielding wall and drop can yet more reliably prevent the water droplets from entering the interior of the air cleaner.

Particularly with the fourth feature, reducing the flow rate of intake air in the vicinity of the suction opening can make it difficult for water droplets such as raindrops to be drawn toward the suction opening side to thereby promote the effect of preventing water droplets from entering the interior of the air cleaner.

In accordance with the fifth to the ninth features of the present invention, when the cleaner element unit is removed from the intake passage for maintenance such as replacement or cleaning of the cleaner element, the seal packing remains in its original position and is not detached, assembly of the seal packing is not forgotten, and the seal packing is not lost.

Particularly with the ninth feature, it is possible to provide the retaining member on the seal packing without affecting the operation of the seal face of the seal packing.

In accordance with the tenth to the thirteenth features of the present invention, since the air cleaner can be secured to and supported on the engine at three points and, in particular, the cleaner cover body is secured to the engine by utilizing the high-rigidity reinforcing vertical wall of the cleaner cover body, it is possible to enhance rigidity for supporting the air cleaner on the engine.

Particularly with the twelfth feature, it is possible to secure the reinforcing vertical wall portion of the cleaner cover body, which faces the engine across a gap, to the engine in the proximity of the engine, thus further enhancing the rigidity for supporting the air cleaner on the engine.

Particularly with the thirteenth feature, the direction in which the three connecting bolts are secured is the same; moreover, they can be operated from outside the cleaner cover body, and the operation of securing the air cleaner to the engine is easy.

DESCRIPTION OF REFERENCE NUMERALS AND SYMBOLS

Figure 1:
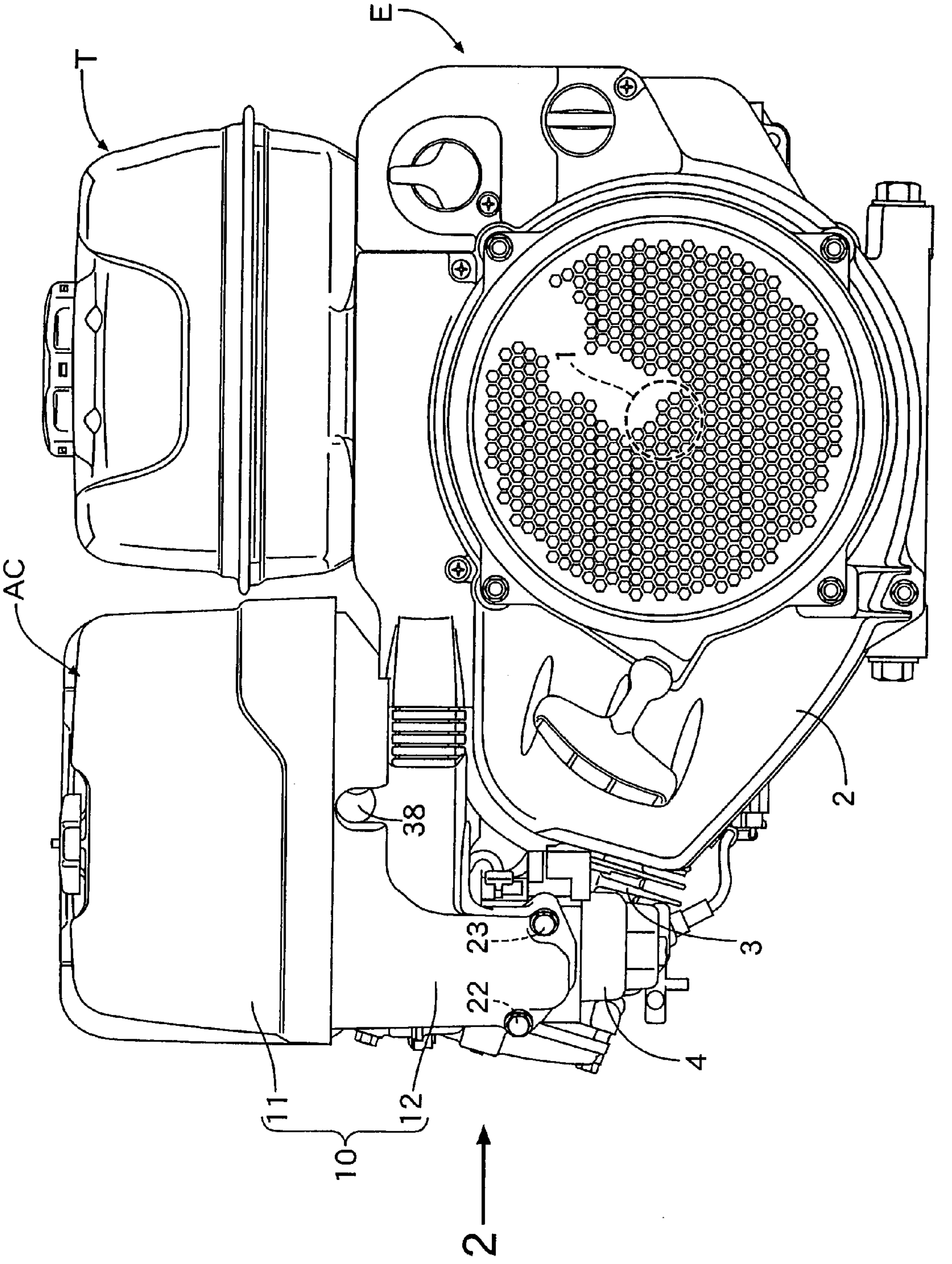
FIG. 1 is a front view of a general purpose engine unit equipped with an air cleaner of the present invention (first embodiment).

4 carburetor
10 cleaner cover body
11 upper cover body
11*a* skirt wall
12 lower cover body
13 intake duct
14 dividing wall
16 discharge opening
17 intake passage
22 securing member (connecting bolt)
23 securing member (connecting bolt)
24 securing member (connecting bolt)
37 vertical wall portion
38 boss
39 hollow cylindrical hole
50 suction opening
50*a* widening portion
50*c* center of suction opening
51 intake tube
53 shielding wall
54 gap
68 seal packing
71, 73 seal face
75 retaining member (retaining projection)
22I central axis
23I central axis
24I central axis
268 seal packing
271, 273 seal face
275, 276 retaining member (retaining projection)
368 seal packing
371, 373 seal face
378 retaining member (retaining projection)
379 channel
E engine
Ep intake port
Ue cleaner element Unit

BEST MODE FOR CARRYING OUT THE INVENTION

Modes for carrying out the present invention are specifically explained below by reference to embodiments of the present invention illustrated in the attached drawings.

Embodiment 1

Referring first to FIGS. 1 to 11, Embodiment 1 of the present invention is explained.

Figure 2:
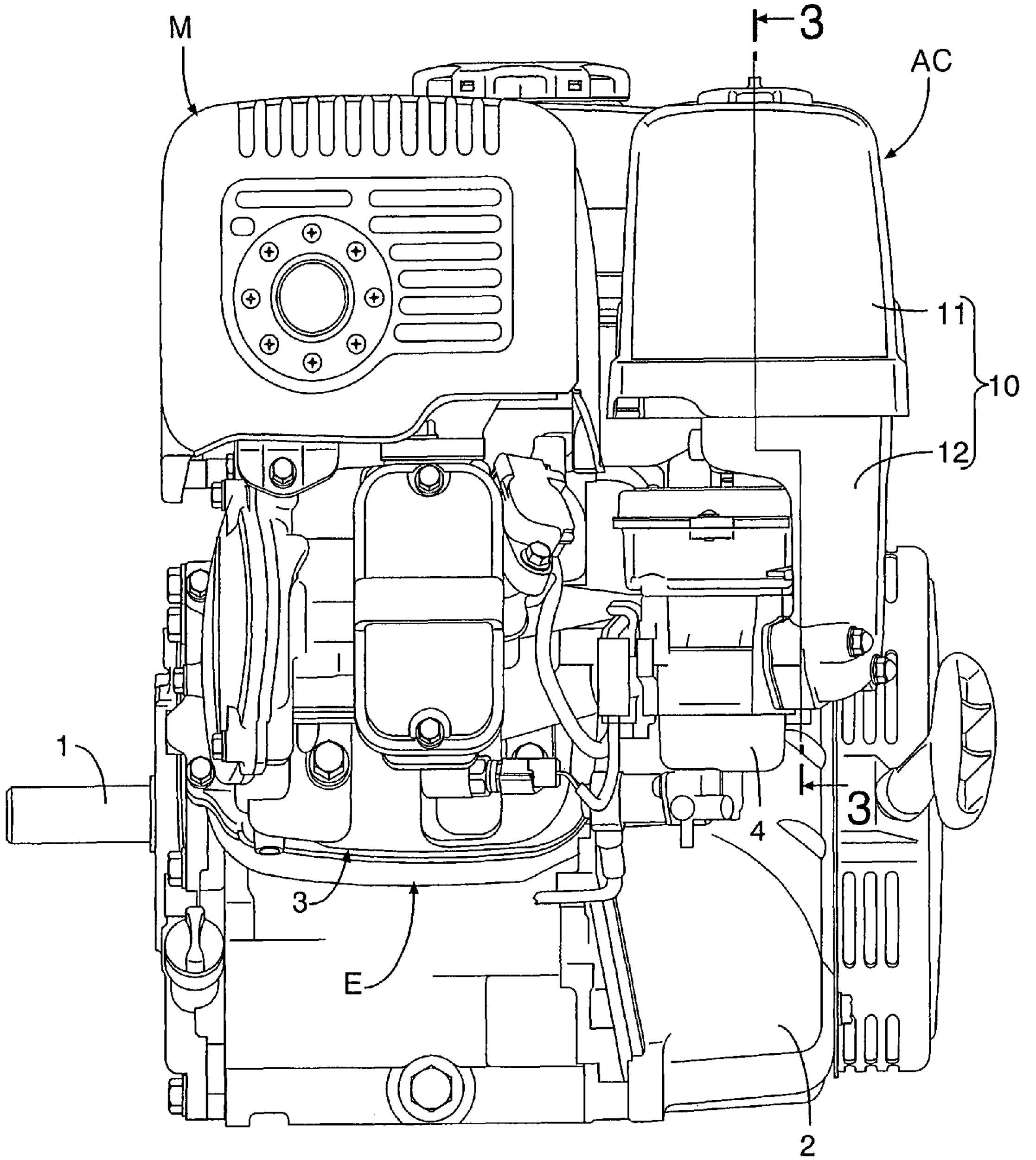
FIG. 2 is a view from arrow 2 in FIG. 1 (first embodiment).

In FIGS. 1 and 2, a general purpose engine E, which is a power source for various types of work machine, of a general purpose engine unit is a four-cycle engine, and includes a crankcase 2 supporting a horizontally disposed crankshaft 1 and a cylinder part 3 projecting obliquely upward from the crankcase 2. A fuel tank T is disposed immediately above and supported on the crankcase 2. A carburetor 4 is mounted on one side of the cylinder part 3. An air cleaner AC connected to the carburetor 4 and an exhaust muffler M connected to the other side of the cylinder part 3 are disposed immediately above the cylinder part 3 so as to be arranged in a line to the side of the fuel tank T.

The structure of the air cleaner AC according to the present invention is now explained in detail by reference to FIGS. 1 to 11.

Figure 3:
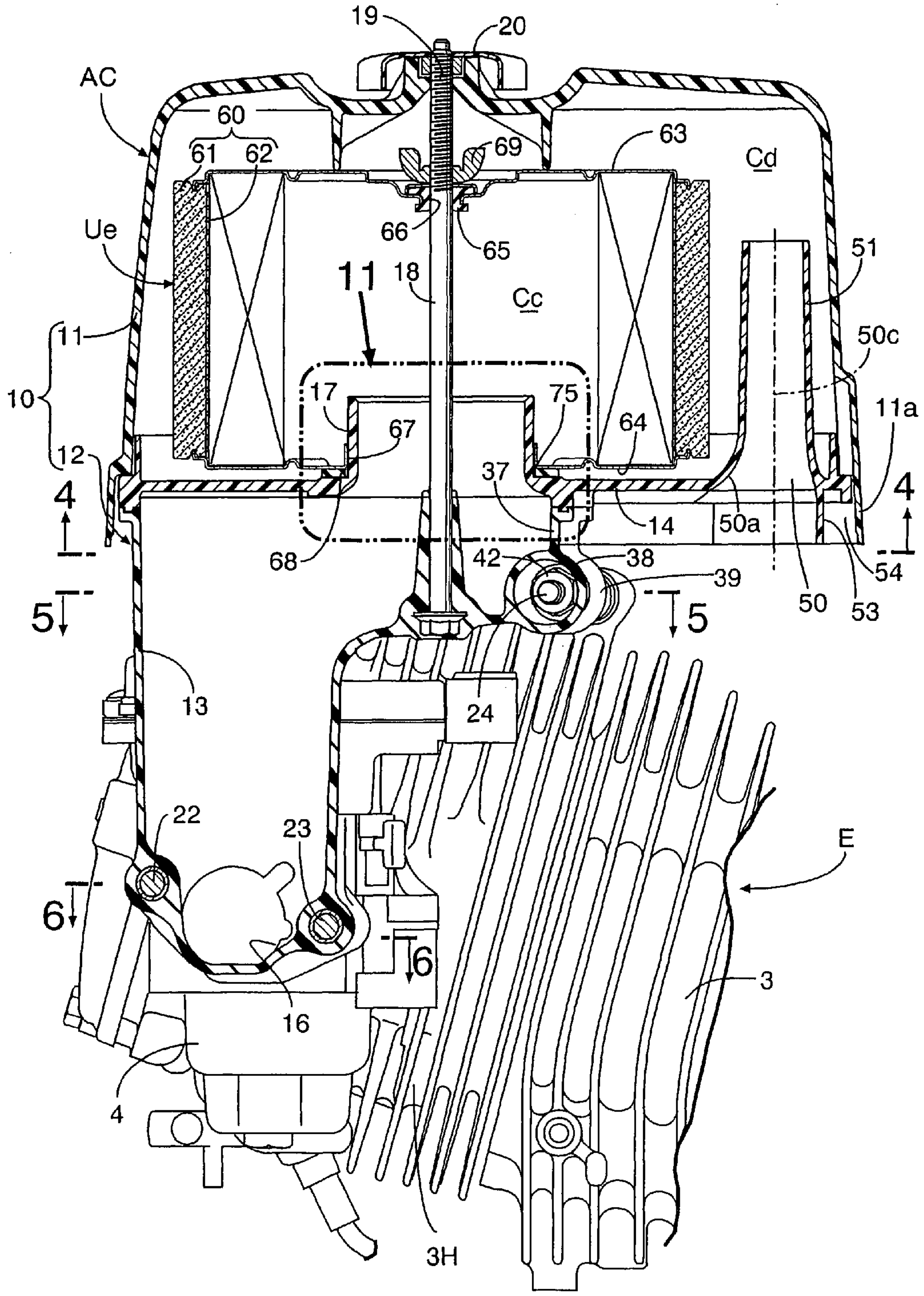
FIG. 3 is an enlarged sectional view along line 3-3 in FIG. 2 (first embodiment).

As is most clearly shown in FIG. 3, a cleaner cover body 10, which is an outer shell of the air cleaner AC, is made of a synthetic resin and is formed by integrally joining an upper cover body 11 and a lower cover body 12. The upper cover 11 is formed into a cap shape having a lower open face. The lower cover body 12 is formed in a hermetically sealed manner from an intake duct 13 formed into an elbow shape that is long in the vertical direction, and a dividing wall 14 closing the upper open face of the intake duct 13. An upper face of the lower cover body 12 is hermetically fitted into and detachably connected to the lower open face of the upper cover body 11.

Figure 4:
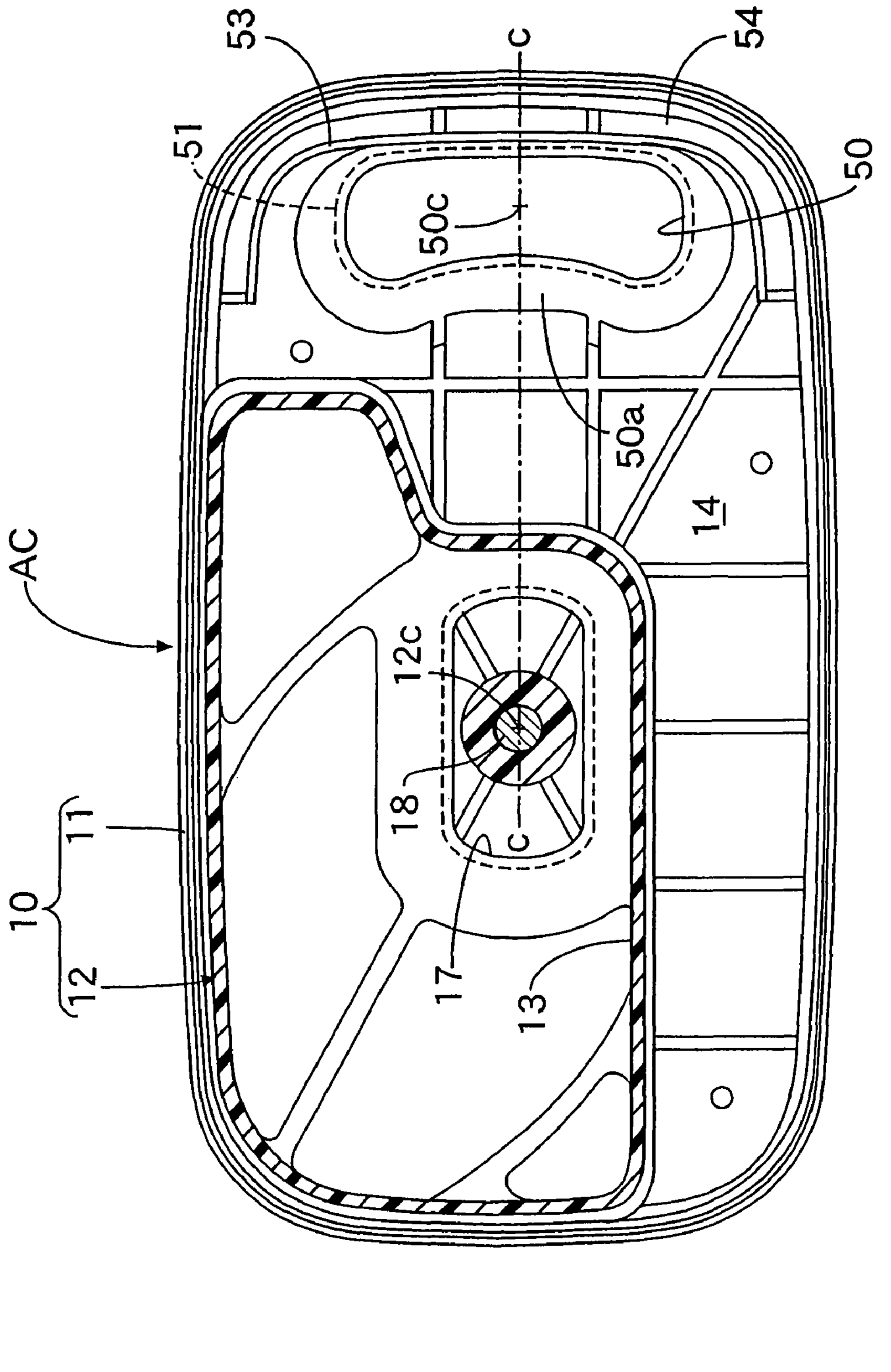
FIG. 4 is a sectional view along line 4-4 in FIG. 3 (first embodiment).
Figure 8:
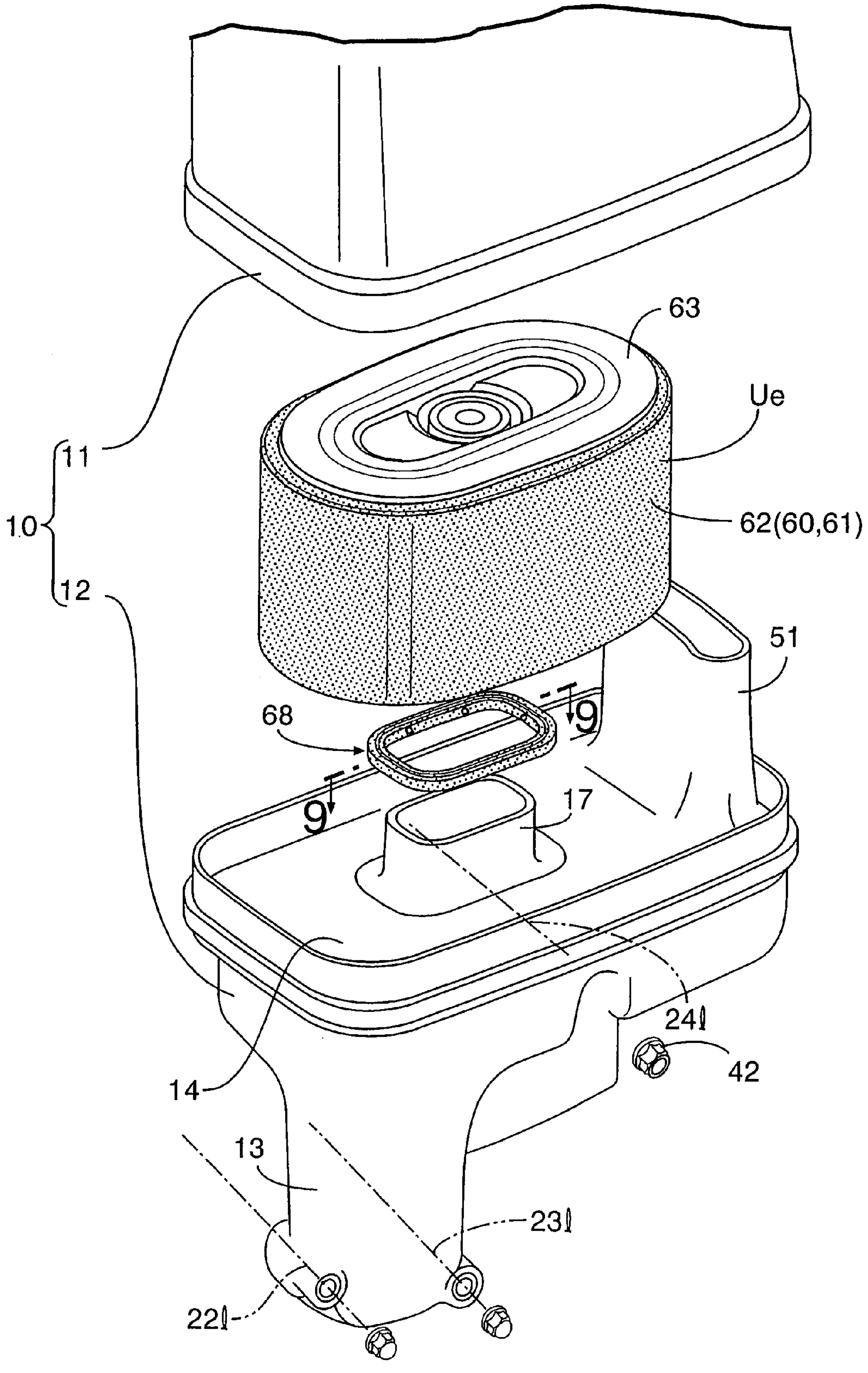
FIG. 8 is an exploded perspective view of the air cleaner (first embodiment).

As shown in FIGS. 3 and 4, and FIG. 8, a rectangular tube-shaped intake passage 17 is provided integrally with a middle section of the dividing wall 14 so as to project toward the interior of the upper cover body 11, and the interior of the upper cover body 11 and the interior of the lower cover body 12 communicate with each other via the intake passage 17. A vertically extending supporting bolt 18 is fixed to an upper part of the intake duct 13 of the lower cover body 12. This supporting bolt 18 passes through the intake passage 17 and passes vertically through the interior of the upper cover body 11. A threaded portion of the upper end of the supporting bolt 18 projects outward through a mounting hole 19 provided in an upper wall of the upper cover body. By screwing a nut 20 around the threaded portion, the upper cover body 11 is detachably fixed on the dividing wall 14 of the lower cover body 12.

Figure 6:
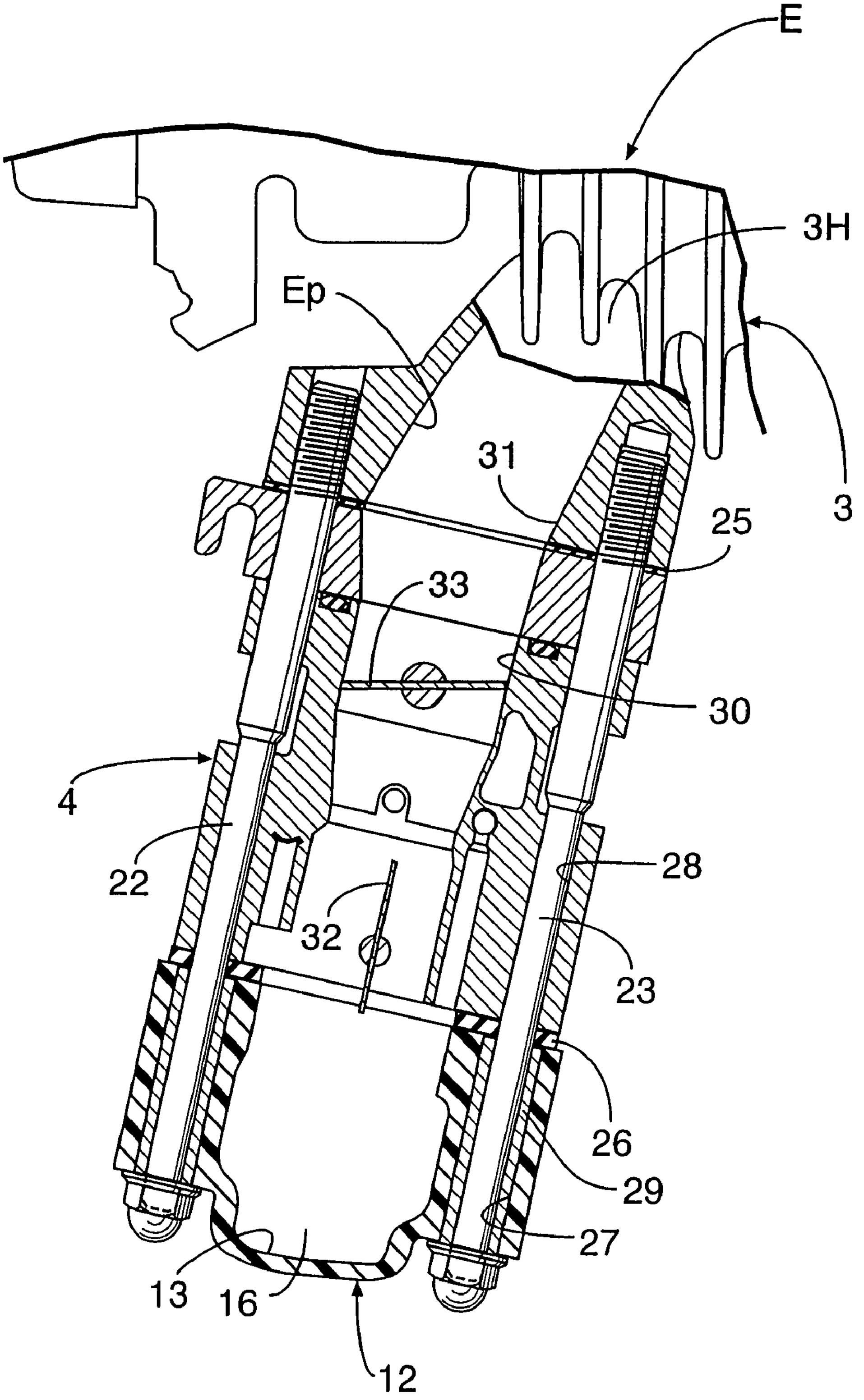
FIG. 6 is a sectional view along line 6-6 in FIG. 3 (first embodiment).

A discharge opening 16 of the air cleaner AC opens at the lower end of the lower cover body 12, that is, the lower end of the intake duct 13, and this discharge opening 16 is connected to the upstream end of the carburetor 4 (see FIG. 6). As described later, the air cleaner AC has its lower cover body 12 fixed to and supported on the cylinder part 3 of the engine E with high rigidity.

This support structure is now explained by reference to FIGS. 2 to 7.

Figure 5:
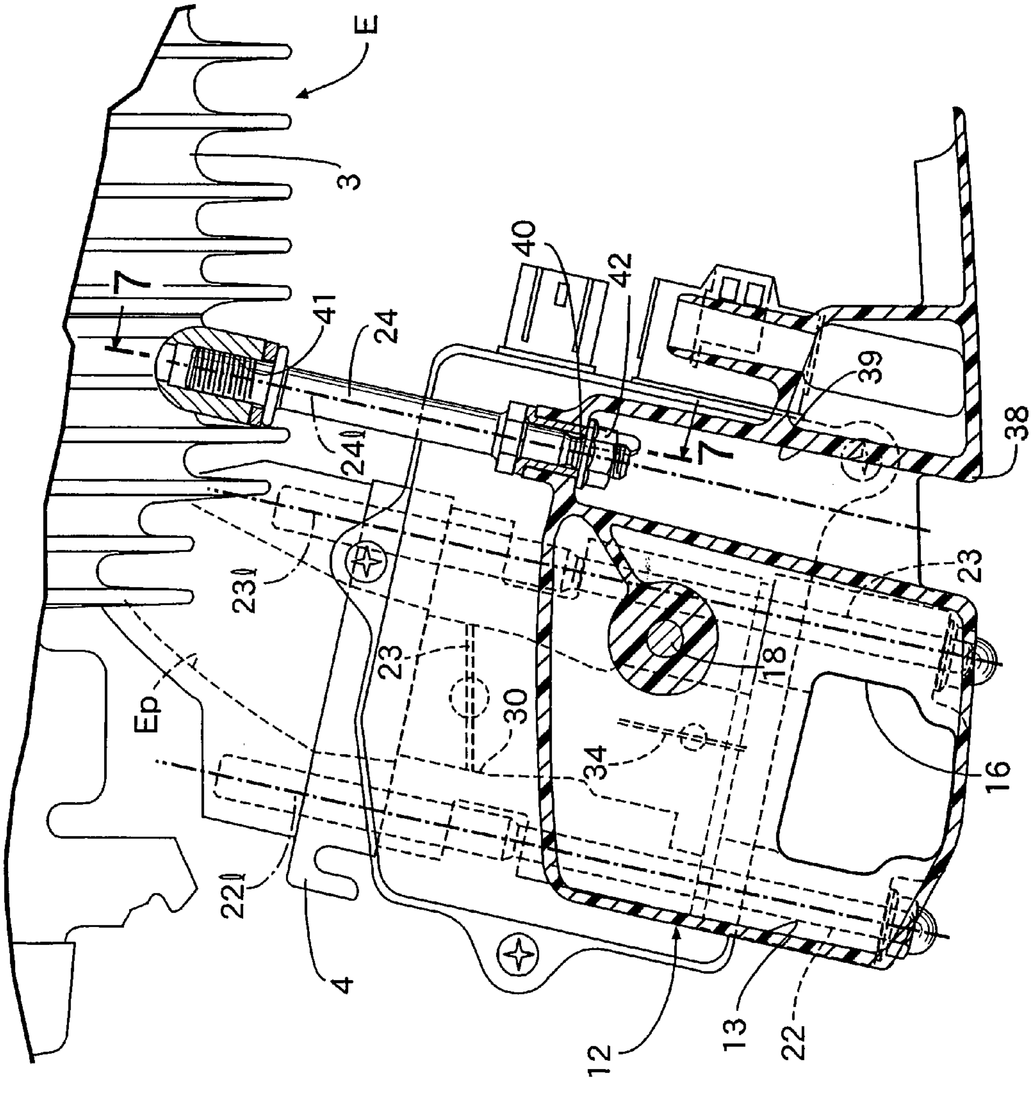
FIG. 5 is a sectional view along line 5-5 in FIG. 3 (first embodiment).
Figure 7:
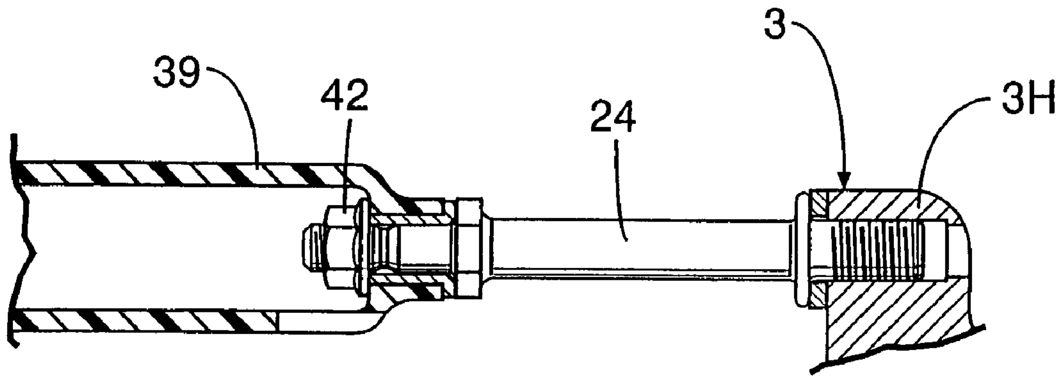
FIG. 7 is a sectional view along line 7-7 in FIG. 5 (first embodiment).

The air cleaner AC has its lower cover body 12 supported on the cylinder part 3 of the engine E at three points. Specifically, as shown in FIGS. 3 and 6, a lower end portion of the lower cover body 12 is supported, via the carburetor 4, on the cylinder part 3 of the engine E at two points by two connecting bolts 22 and 23; and as shown in FIGS. 3, 5 and 7, an upper end portion, that is, a portion close to the dividing wall 14, of the lower cover body 12 is supported directly on the cylinder part 3 of the engine E at one point by one connecting bolt 24. As shown in FIG. 6, the downstream side of the carburetor 4 is connected to a cylinder head section 3H of the cylinder part 3 of the engine E via a gasket 25, and the lower end portion of the lower cover body 12 is connected integrally to the upstream side of the carburetor 4 with a packing 26 interposed therebetween. The lower end portion of the lower cover body 12 is secured by the two connecting bolts 22 and 23 running through bolt holes 27 and 28 provided in the lower cover body 12 and the carburetor 4 and screwed into the cylinder head section 3H of the cylinder part 3. A metal sleeve 29 is fitted into the bolt hole 27 of the lower cover body 12 so that the lower cover body 12 is not deformed by tightening of the connecting bolts 22 and 23. The intake duct 13 formed in the lower cover body 12 of the air cleaner AC communicates with an intake port Ep of the engine E through an intake path 30 of the carburetor 4, and intake air within the air cleaner AC is mixed with fuel in the carburetor 4 and then guided to the intake port Ep as usual.

In FIG. 6, reference numerals 32 and 33 denote a choke valve and a throttle valve provided in the intake path 30 of the carburetor 4 so as to be capable of opening and closing.

As shown in FIGS. 3 and 5, a tubular boss 38 is formed integrally with a high-rigidity vertical wall part 37, which is an upper end portion close to the dividing wall 14, of the lower cover body 12 of the air cleaner AC. Formed integrally with this boss 38 is a long bottomed hollow cylindrical hole 39 extending toward the interior of the lower cover body 12, that is, the cylinder part 3 of the engine E. A bolt hole 40 is penetratingly provided in a bottom wall of this hollow cylindrical hole 39. A bolt thread hole 41 is provided in a wall face, facing the bolt hole 40, of the cylinder head section 3H of the cylinder part 3, and as shown in FIG. 5, the bolt hole 40 and the bolt thread hole 41 are on the same axis. A stud bolt 24 as the connecting bolt is screwed into the bolt thread hole 41. This stud bolt 24 runs through the bolt hole 40 of the lower cover body 12 and then its threaded portion projects into the interior of the hollow cylindrical hole 39. By screwing a nut 42 around the threaded portion, the upper part of the lower cover body 12 can be fixed to the cylinder head section 3H of the cylinder part 3 by means of this one connecting bolt 24. Therefore, in the upper part of the lower cover body 12, its high rigidity vertical wall part 37 (being in the vicinity of the dividing wall 14 and reinforced by the boss 38) is firmly fixed to the cylinder part 3 of the engine E by the connecting bolt 24.

As shown in FIG. 5, axes 22I and 23I of the two connecting bolts 22 and 23 and an axis 24I of the stud bolt 24 are substantially parallel to each other, the directions in which they are secured are identical to each other, and all of these three connecting bolts 22, 23, and 24 can be tightened and loosened from outside the air cleaner AC. Therefore, it is easy to handle the air cleaner AC with respect to the cylinder part 3 of the engine E.

As described above, since the lower cover body 12 of the air cleaner AC is fixedly supported on the cylinder part 3 of the engine E at the three points by the three connecting bolts 22, 23, and 24, the rigidity for supporting the air cleaner AC can be greatly enhanced. Further, the boss 38 includes the hollow cylindrical hole 39, which is deep in the direction toward the cylinder part 3, to thereby reduce the tightening distance required by the connecting bolt 24. Therefore, it is possible to make the air cleaner AC be close to the cylinder part 3, which is a mounting section on the engine side, and fixedly support the air cleaner AC thereon, thus further enhancing the rigidity for supporting the air cleaner AC.

As shown in FIGS. 3 and 8, a cleaner element unit Ue, which is described later, is detachably housed within the upper cover body 11 of the air cleaner AC.

A suction opening 50 for taking in outside air is formed in one side (right side in FIGS. 3 and 4) of the dividing wall 14 of the lower cover body 12, that is, an upper wall of the lower cover body 12. This suction opening 50 is, as shown in FIG. 4, formed as a long hole that is long in a direction perpendicular to a central line c-c running through the center 50*c* of the suction opening 50 and the center 18*c* of the supporting bolt 18. The suction opening 50 has a widening portion 50*a*, which widens toward a middle 0 side of the lower cover body 12 relative to the center 50*c*, thus having a large area overall. As shown in FIG. 3, connected integrally to the suction opening 50 is a rectangular tube-shaped intake tube 51 extending toward the interior of the upper cover body 11. This intake tube 51 is formed into a chimney shape that is gradually narrowed from an entrance on the intake opening 50 side toward an exit at the upper end thereof.

An integral shielding wall 53 is formed downward along an outer open edge, on the side away from the cleaner element unit Ue, of the suction opening 50. This shielding wall 53, as shown in FIG. 4, extends in a direction away from the suction opening 50 so as to cover the suction opening 50, is then curved so as to cover longitudinally opposite ends of the suction opening 50, and is connected to a lower part of an inner face of the upper cover body 11. The shielding wall 53 is therefore arranged so as to cover substantially half of the suction opening 50 on the side away from the cleaner element unit Ue. Further, the lower end of a skirt wall 11*a*, in the vicinity of the suction opening 50, of the upper cover body 11 extends further downward than the suction opening 50, its extended portion extends so as to face the shielding wall 53 and be arranged side by side with the shielding wall 53, and the lower end of the extended portion is at substantially the same level as the lower end of the shielding wall 53. As shown in FIG. 3, the shielding wall 53 and the skirt wall 11*a* of the upper cover body 11 face each other to form a double wall beneath the outer open edge of the suction opening 50, and a gap 54 opening downward is formed therebetween.

A general purpose engine work machine is often generally used outdoors, and when used in rain, raindrops that have fallen on the upper cover 11 of the air cleaner AC can naturally be expected to travel from an upper face of the upper cover body 11 along the skirt wall 11*a*, reach the lower edge thereof, and be sucked into the interior of the air cleaner AC through the suction opening 50. However, this embodiment has a structure for positively preventing the entrance of raindrops into the interior of the air cleaner AC, that is, (1) since the lower end of the skirt wall 11*a* in the vicinity of the suction opening 50 extends further downward than the level of the suction opening 50, it is possible to prevent raindrops from being drawn toward the suction opening 50 due to the intake negative pressure.

(2) Since the double wall is formed by the skirt wall 11*a* of the upper cover body 11 and the shielding wall 53, which cover the suction opening 50 and extend further downward than the suction opening 50, although raindrops that have been drawn toward the suction opening 50 in spite of the above-mentioned (1) flow into the gap 54 while going around the lower edge of the skirt wall 11*a*, here the raindrops can be made to collide with the shielding wall 53 and drop, thereby yet more reliably preventing raindrops from being sucked into the suction opening 50.

(3) Since the suction opening 50 includes the widening portion 50*a*, which widens, relative to the center 50*c* thereof, toward the center 18*c* of the supporting bolt 18, that is, toward the middle of the cover body 10, and the intake tube 51 connected to the suction opening 50 is gradually narrowed from the entrance to the exit thereof, the intake negative pressure becomes weak in the vicinity of the suction opening 50 to reduce the flow rate of intake air in this section, thereby promoting the effect of preventing raindrops from being sucked into the interior of the air cleaner AC exhibited by the above-mentioned (1) and (2).

The cleaner element unit Ue is supported and housed within the upper cover body 11 of the cleaner cover body 10. This cleaner element unit Ue is formed into an overall elliptical tubular shape, as shown in FIGS. 3 and 8, comprising a cleaner element 60, a metallic upper plate 63, and a metallic lower plate 64. The cleaner element 60 is formed by layering a paper cleaner 62 and a urethane cleaner 61 in an elliptical tubular shape having upper and lower open faces. The upper plate 63 and the lower plate 64 are mounted so as to close the upper and lower open faces of the cleaner element 60. A mounting hole 66 is provided in a central area of the upper plate 63, a rubber bush 65 being fitted into the mounting hole 66. A mating hole 67 opens in a central area of the lower plate 64, the mating hole 67 being detachably fitted onto the rectangular tube-shaped air passage 17 projectingly provided on the dividing wall 14.

As shown in FIG. 3, in the cleaner element unit Ue, the mating hole 67 of the lower plate 64 is fitted onto the outer periphery of the intake passage 17 and is seated on the dividing wall 14 via a seal packing 68. The supporting bolt 18, which runs through the intake passage 17 and passes vertically through the interior of the cleaner element, has a threaded portion at the upper end penetrating the rubber bush 65 of the mounting hole 66 and projecting outward. Screwing a nut 69 around the projecting end enables the cleaner element unit Ue to be detachably fixed to and supported on the dividing wall 14 of the lower cover body 12 via the seal packing 68.

This cleaner element unit Ue divides the interior of the upper cover body 11 into an uncleaned chamber Cd on the outside of the cleaner element unit Ue and a cleaned chamber Cc on the inside of the cleaner element unit Ue: outside air is taken into the uncleaned chamber Cd via the suction opening 50 accompanying running of the engine E; is filtered by passing through the cleaner element 60; then enters the cleaned chamber Cc; and is guided from the intake passage 17 to the carburetor 4 via the intake duct 13.

Figure 9:
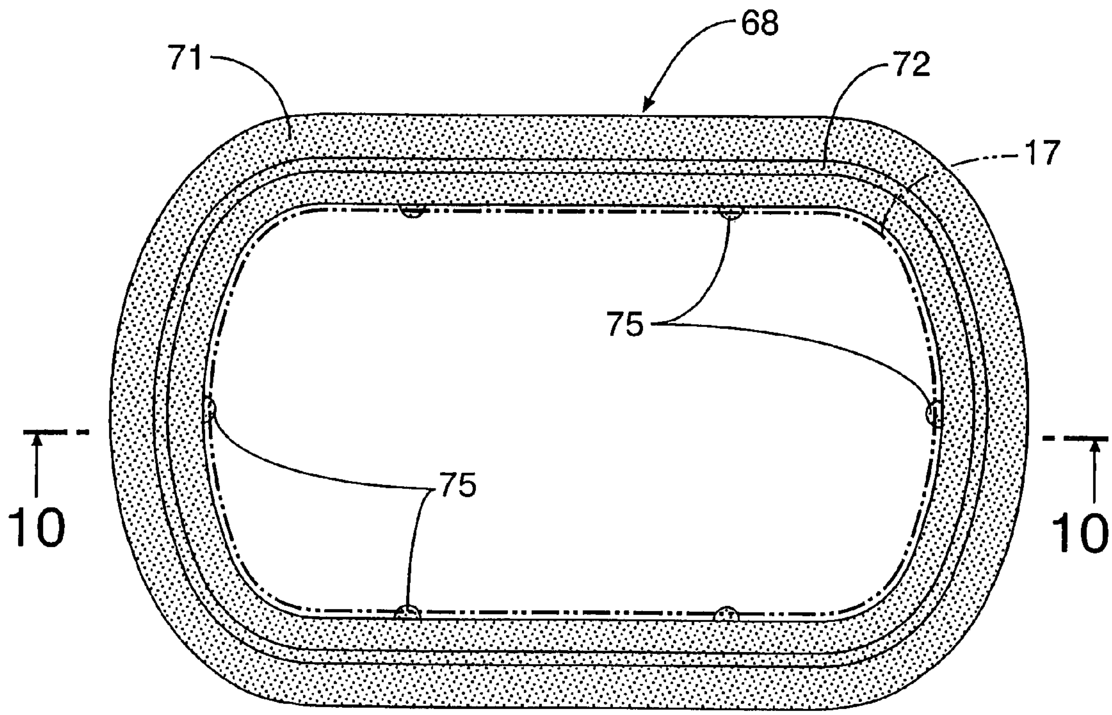
FIG. 9 is an enlarged plan view of a seal packing along line 9-9 in FIG. 8 (first embodiment).
Figure 10:
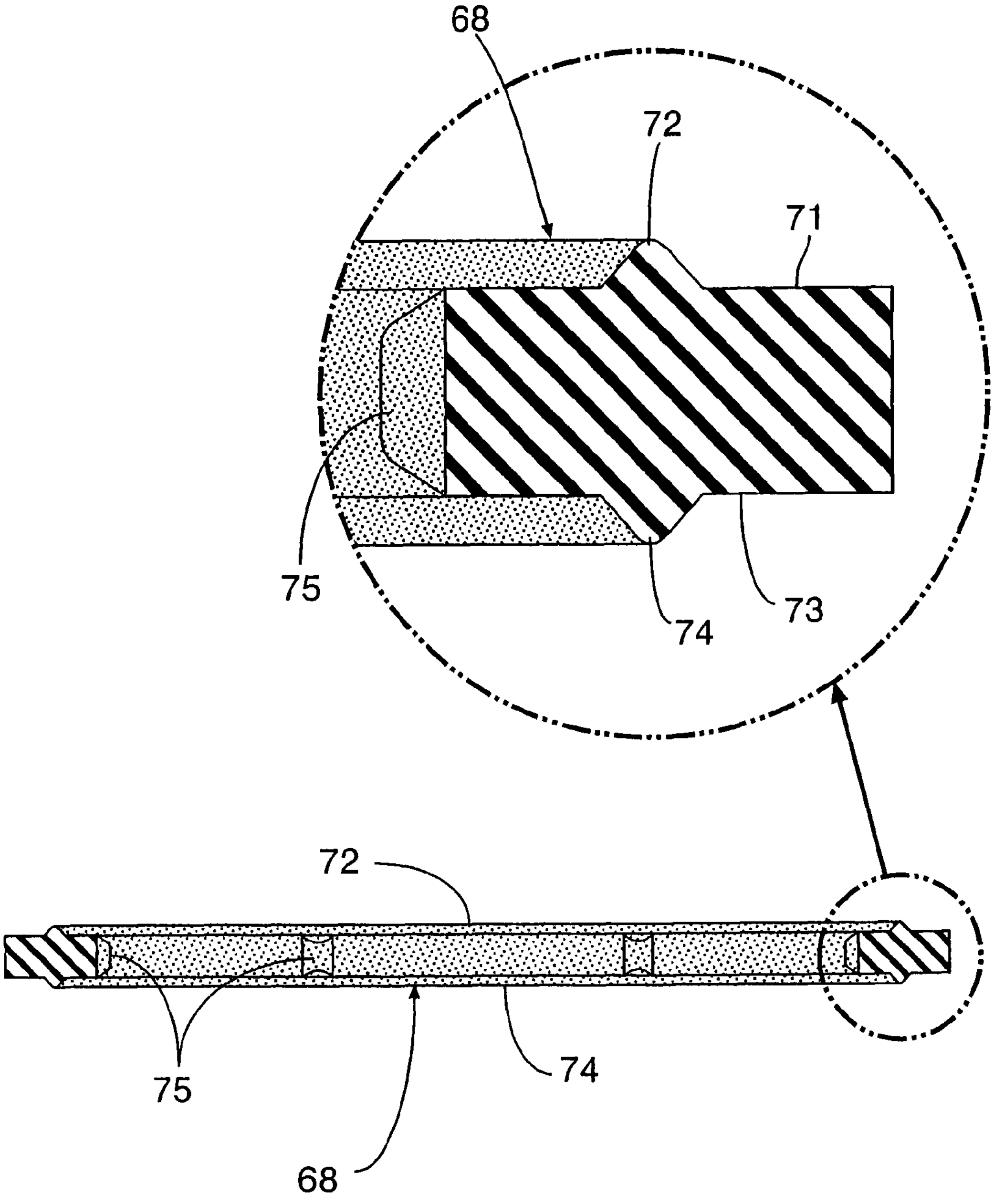
FIG. 10 is a sectional view along line 10-10 in FIG. 9 (first embodiment).
Figure 11:
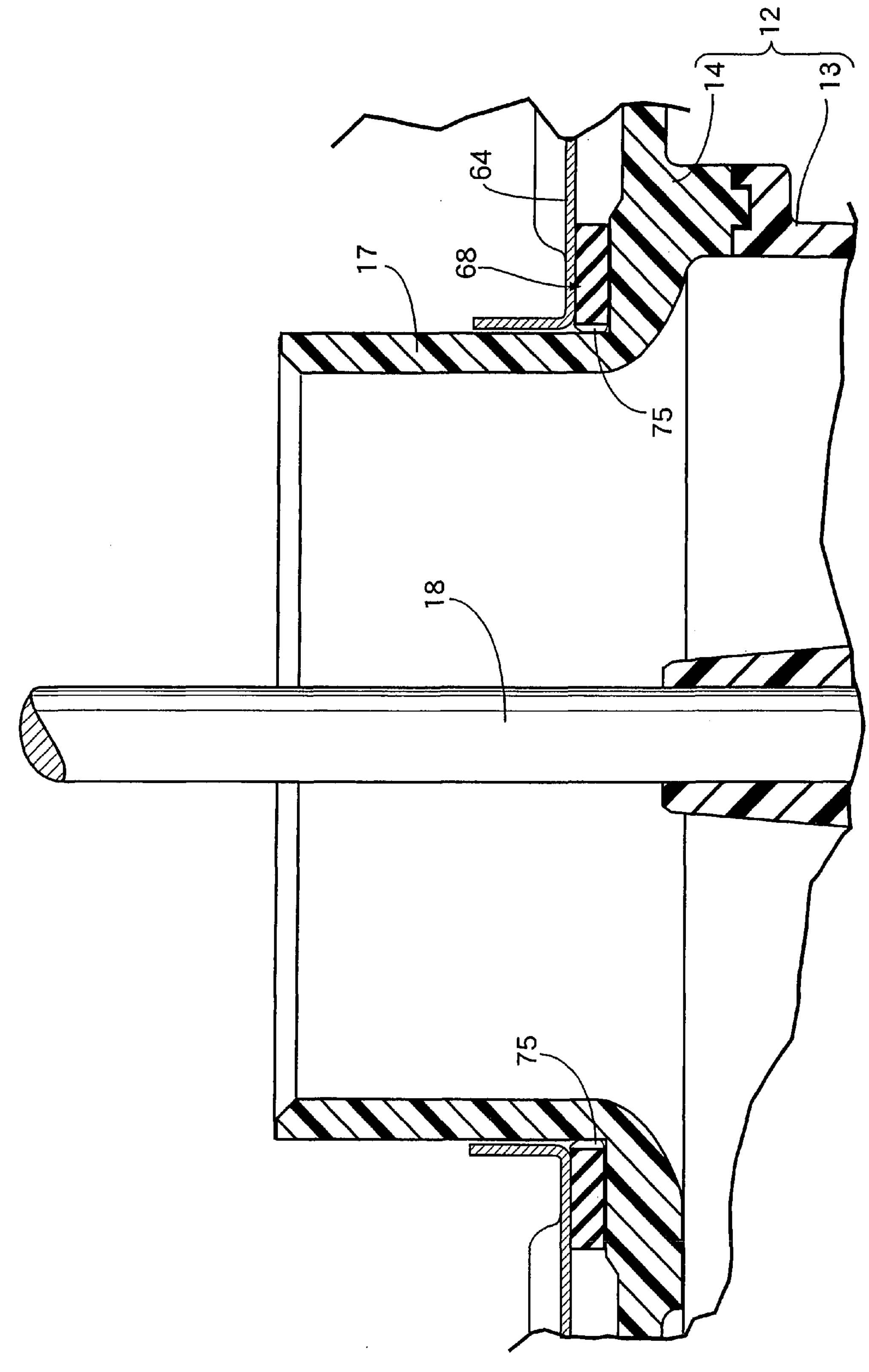
FIG. 11 is an enlarged view of a section surrounded by the virtual line in FIG. 3 (first embodiment).

The seal packing 68, which is a rubber packing, is held between the upper face of the dividing wall 14 and the lower face of the lower plate 64 of the cleaner element unit Ue. This seal packing 68 makes a hermetic seal between the uncleaned chamber Cd and the cleaned chamber Cc, thus preventing uncleaned outside air from being sucked directly into the cleaned chamber Cc. As shown in FIGS. 9, 10, and 11, the seal packing 68 is formed into an endless rectangular shape and is fitted around the outer periphery of a base portion of the rectangular tube-shaped intake passage 17. Upper and lower lip pieces 72 and 74 having a triangular cross-section are projectingly provided integrally with a middle section, in the width direction, of an upper seal face 71 and a lower seal face 73 of the seal packing 68. The upper lip piece 72 is in intimate contact with the lower face of the lower plate 64 of the cleaner element unit Ue. The lower lip piece 74 is in intimate contact with the upper face of the dividing wall 14. Further, a plurality of retaining projections 75 as retaining members are provided integrally with the inner periphery of the seal packing 68 so as to project inwardly, the retaining projections 75 being spaced in the peripheral direction of the seal packing 68. These projections 75 are tightly engaged with the outer periphery of the base portion on the intake passage 17 by virtue of a frictional force therebetween, in such an arrangement that when the cleaner element unit Ue is pulled off the intake passage 17, for example, in order to carry out maintenance such as replacement or cleaning of the cleaner element unit Ue, the seal packing 68 is not unintentionally detached from the intake passage 17 while sticking to the cleaner element unit Ue. Assembly of the seal packing 68 to the intake passage 17 will therefore not be forgotten, and the seal packing 68 will not be lost.

Embodiment 2

Figure 12:
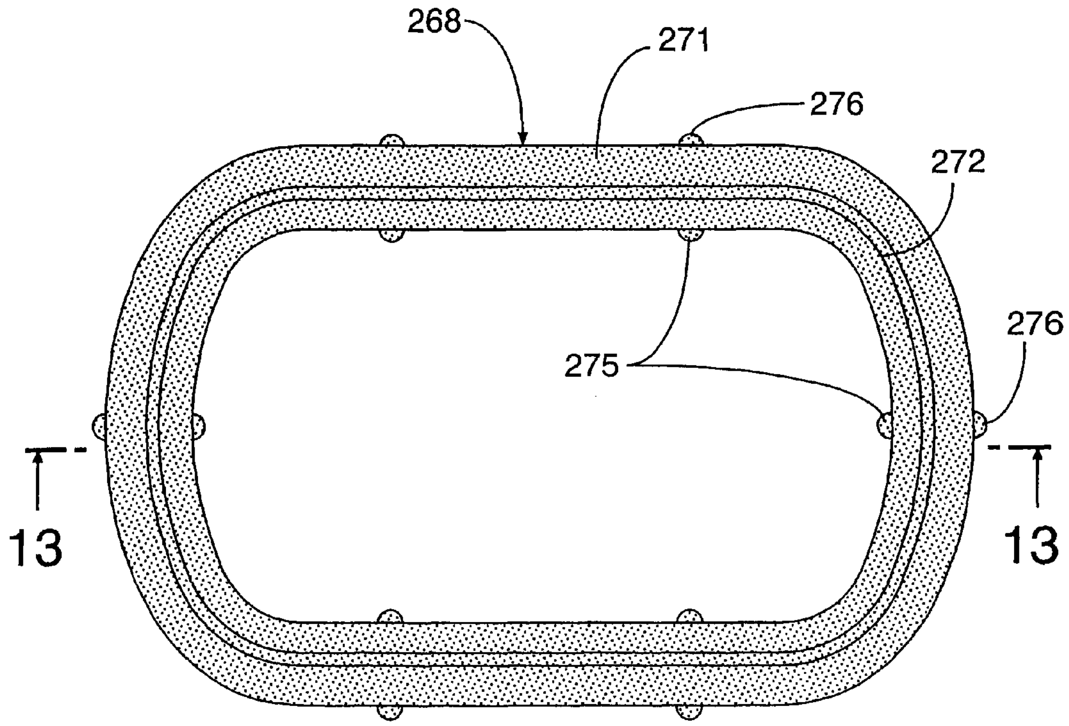
FIG. 12 is a plan view of a seal packing (second embodiment).
Figure 13:
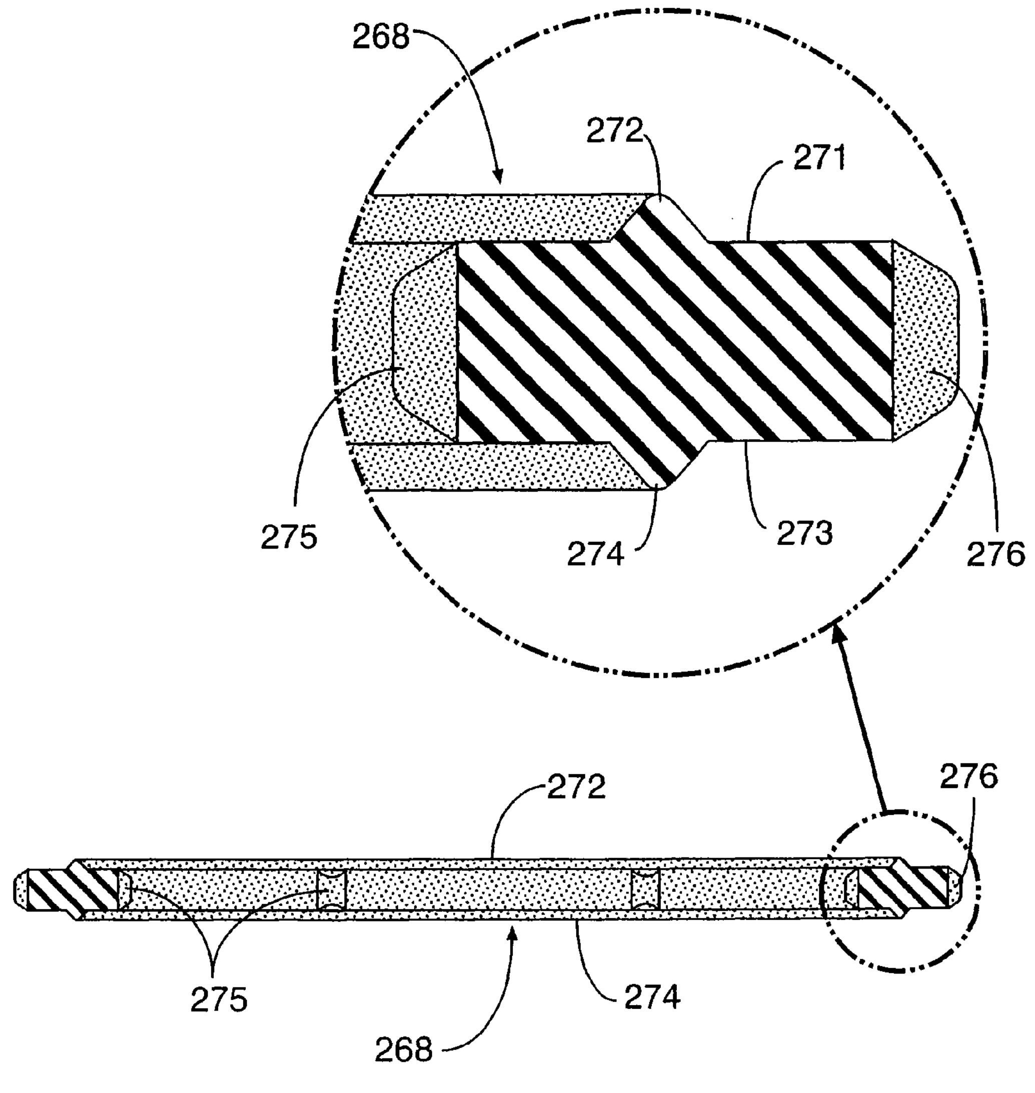
FIG. 13 is a sectional view along line 13-13 in FIG. 12 (second embodiment).

Embodiment 2 of the present invention is now explained by reference to FIGS. 12 to 14.

Embodiment 2 is slightly different from the above-mentioned embodiment in the structure of a seal packing 268, which is a rubber packing, held between the upper face of the dividing wall 14 and the lower face of the lower plate 64 of the cleaner element unit Ue, and in the structure of a mounting section for the seal packing 268. The seal packing 268 is formed into an endless rectangular shape, and is fitted around the outer periphery of the base portion of the rectangular tube-shaped intake passage 17 in the same manner as in Embodiment 1. Upper and lower lip pieces 272 and 274 having a triangular cross-section are projectingly provided integrally with a middle section, in the width direction, of, an upper seal face 271 and a lower seal face 273 of the seal packing 268. The upper lip piece 272 is in intimate contact with the lower face of the lower plate 64 of the cleaner element unit Ue. The lower lip piece 274 is in intimate contact with the upper face of the dividing wall 14. Further, a plurality of inner retaining projections 275 as retaining members are provided integrally with the inner periphery of the seal packing 268 so as to project inwardly. The inner retaining projections 275 are spaced in the peripheral direction of the seal packing 268. A plurality of outer retaining projections 276 as retaining members are provided integrally with the outer periphery of the seal packing 268 so as to project outwardly. The outer retaining projections 276 are spaced in the peripheral direction of the seal packing 268.

Figure 14:
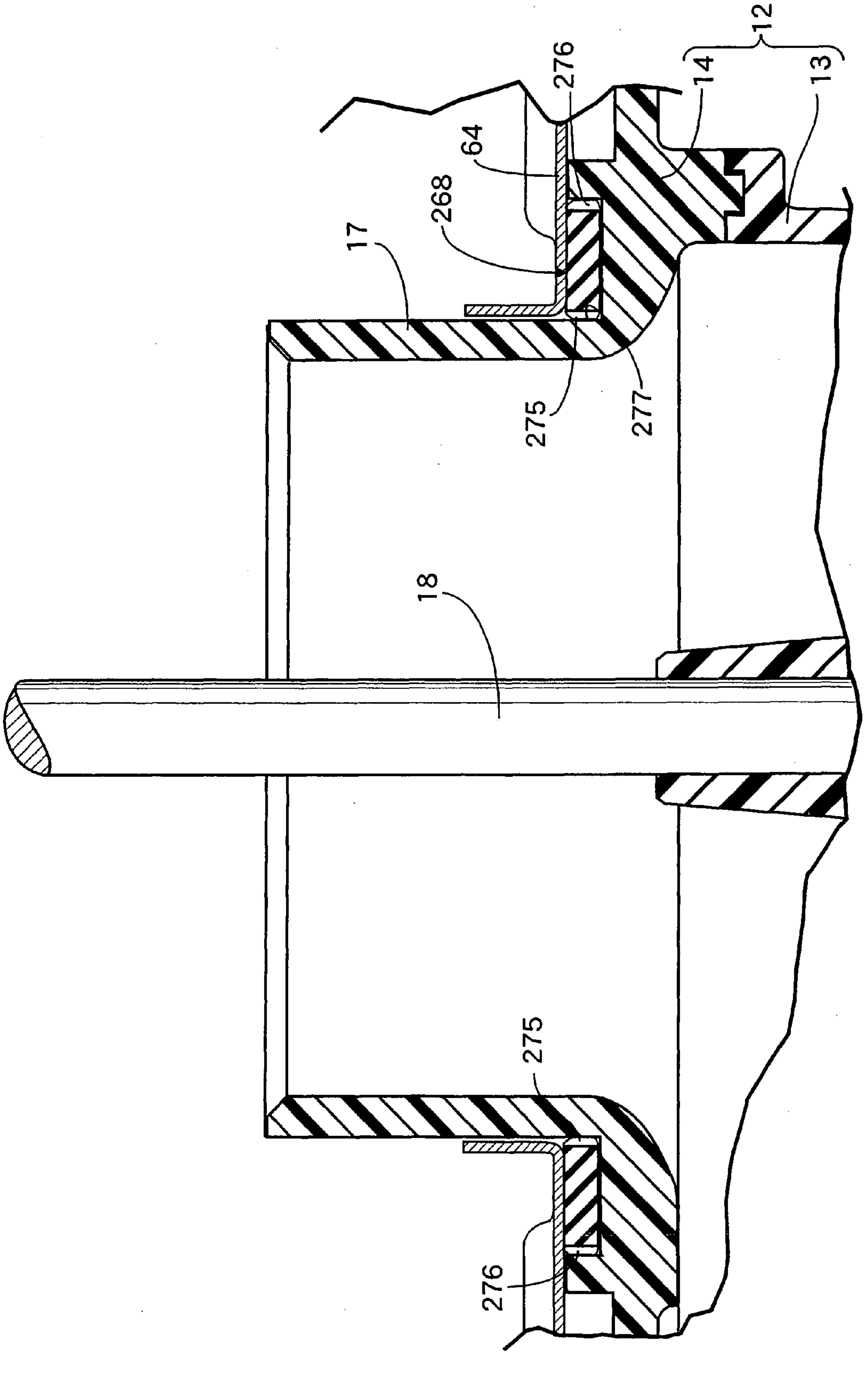
FIG. 14 is a view corresponding to FIG. 11 (Embodiment 1) (second embodiment).

As shown in FIG. 14, an annular channel 277 is formed in the upper face of the dividing wall 14 of the lower cover body 12 so as to surround the base of the intake passage 17, and the seal packing 268 is fitted into the channel 277. The upper and lower seal faces 271 and 273 are in intimate contact with the cleaner element unit Ue and a base face of the channel 277 of the dividing wall 14, thus preventing outside air on the uncleaned chamber Cd side from leaking directly into the cleaned chamber Cc to prevent dirt, etc. from entering the engine E. Further, the inner retaining projections 275 are tightly engaged with the outer periphery of the base portion of the intake passage 17, and the outer retaining projections 276 are tightly engaged with the side face of the channel 277, in such an arrangement that, when the cleaner element unit Ue is pulled off the intake passage 17, for example, in order to carry out maintenance such as replacement or cleaning of the cleaner element unit Ue, the seal packing 268 is not unintentionally detached from the intake passage 17 while sticking to the cleaner element unit Ue. Assembly of the seal packing 268 to the intake passage 17 will therefore not be forgotten, and the seal packing 268 will not be lost.

In Embodiment 2, forming the channel 277 so as to have a dovetail-shaped cross-section and forming the seal packing 268, which is fitted into the channel, so as to similarly have a dovetail shape can yet more reliably prevent the seal packing 268 from being detached from the channel 277.

Embodiment 3

Figure 15:
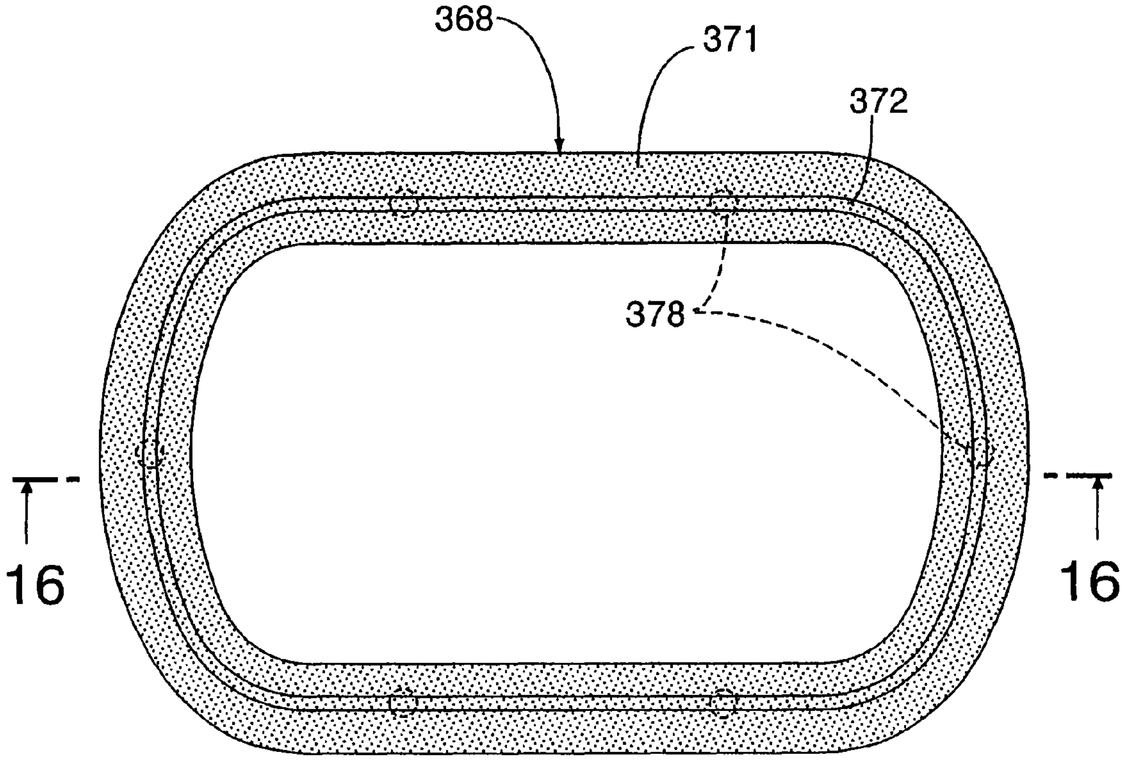
FIG. 15 is a plan view of a seal packing (third embodiment).
Figure 16:
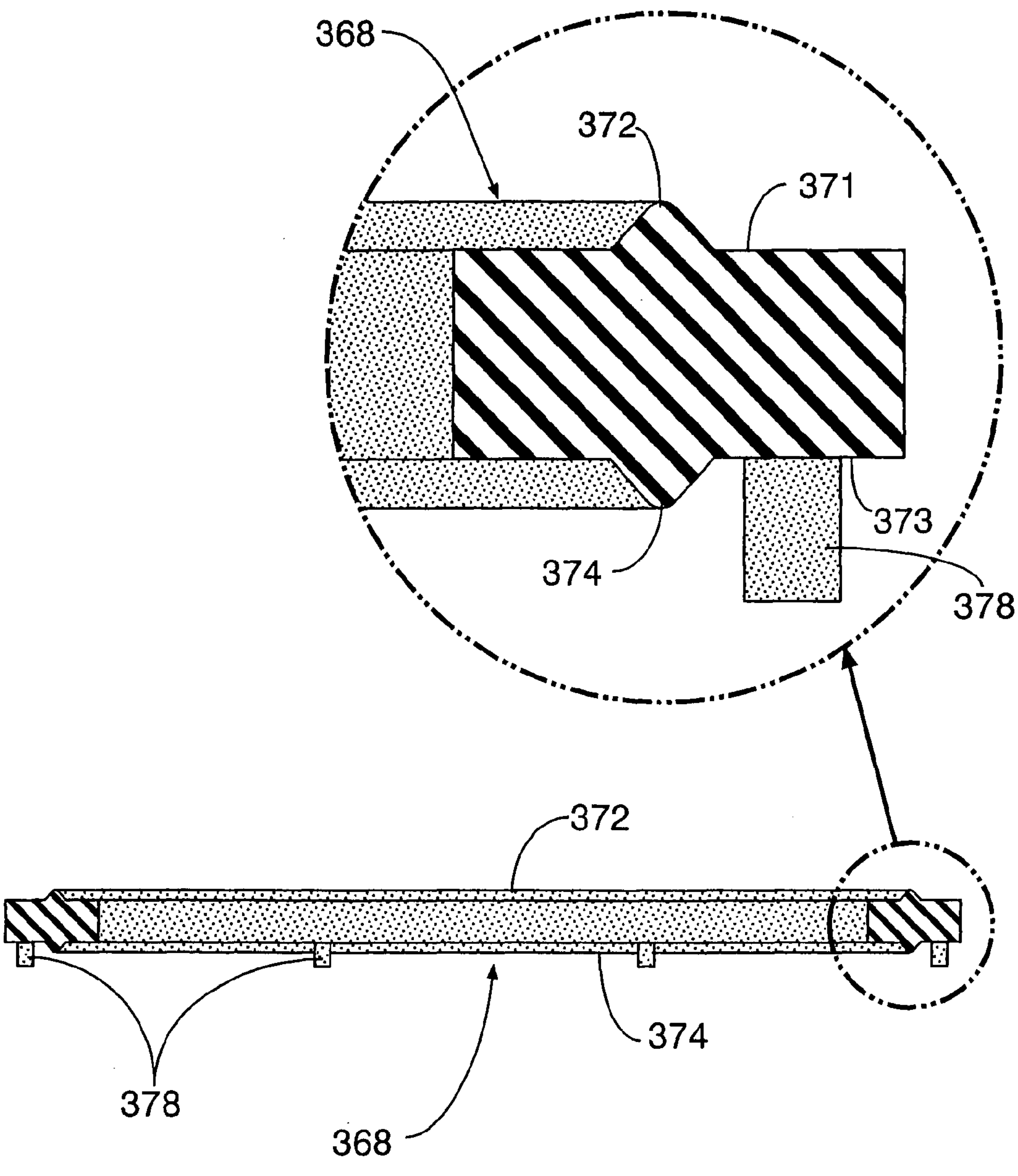
FIG. 16 is a sectional view along line 16-16 in FIG. 15 (third embodiment).

Embodiment 3 of the present invention is now explained by reference to FIGS. 15 to 17.

Embodiment 3 is slightly different from Embodiment 1 in the structure of a seal packing 368, which is a rubber packing, held between the upper face of the dividing wall 14 and the lower face of the lower plate 64 of the cleaner element unit Ue, and in the structure of a mounting section for the seal packing 368. The seal packing 368 is formed into an endless rectangular shape, and is fitted around the outer periphery of the base portion of the rectangular tube-shaped intake passage 17 in the same manner as in Embodiment 1. Upper and lower lip pieces 372 and 374 having a triangular cross-section are projectingly provided integrally with a middle section, in the width direction, of an upper seal face 371 and a lower seal face 373 of the seal packing 368. The upper lip piece 372 is in intimate contact with the lower face of the lower plate 64 of the cleaner element unit Ue. The lower lip piece 374 is in intimate contact with the upper face of the dividing wall 14. Further, a plurality of retaining projections 378 as retaining members are provided integrally with a lower face of the seal packing 368 so as to project downwardly. The retaining projections 378 are spaced in the peripheral direction of the seal packing 368.

Figure 17:
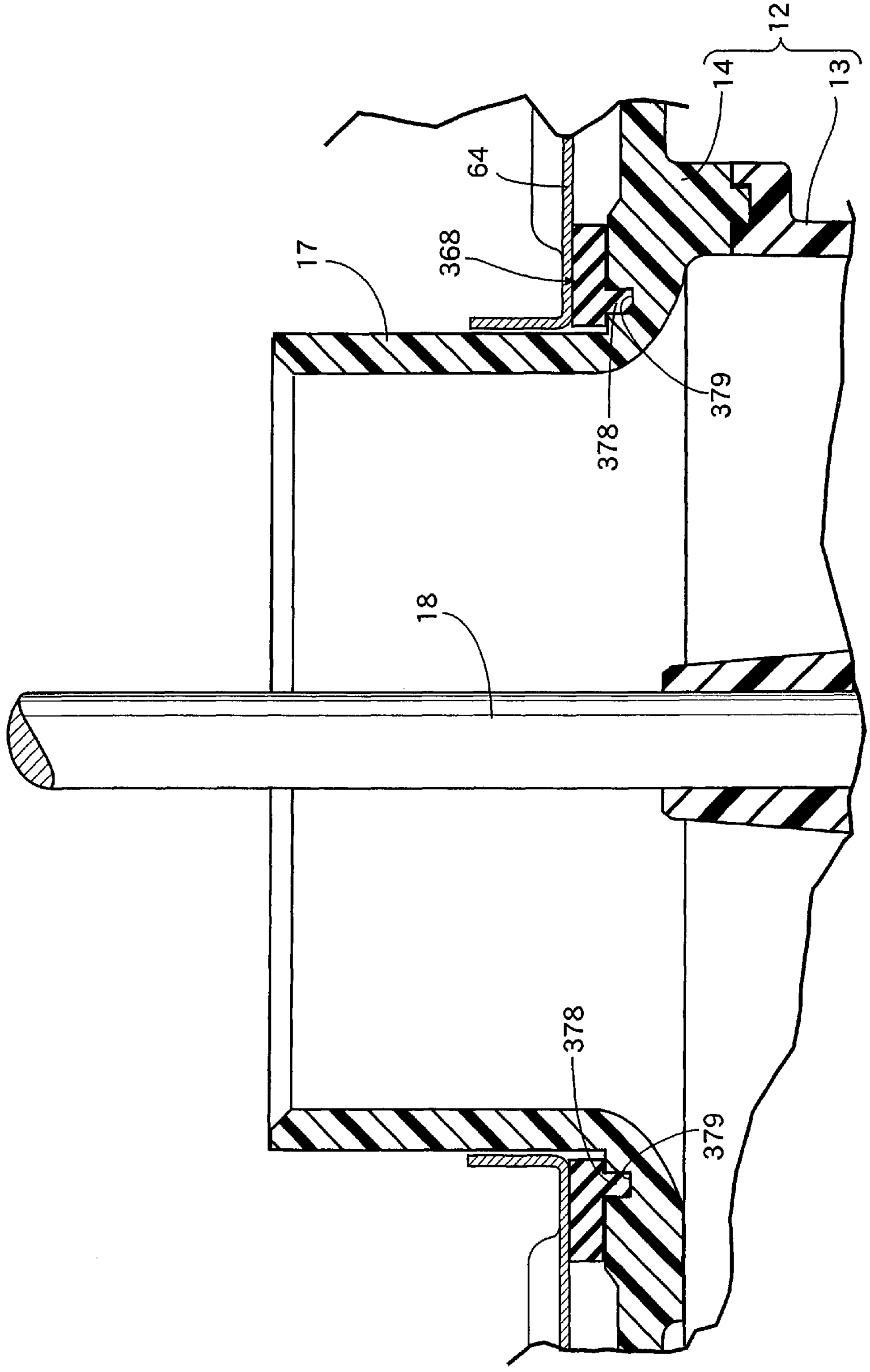
FIG. 17 is a view corresponding to FIG. 11 (Embodiment 1) (third embodiment).

As shown in FIG. 17, an annular channel 379 is formed in the upper face of the dividing wall 14 of the lower cover body 12 so as to surround the base of the intake passage 17, and the retaining projections 378 are fitted into the channel 379. The upper and lower seal faces 371 and 373 are in intimate contact with the cleaner element unit Ue and the dividing wall 14, thus preventing outside air on the uncleaned chamber Cd side from leaking directly into the cleaned chamber Cc to prevent dirt, etc. from entering the engine E. Further, the retaining projections 378 are tightly engaged with the channel 379, in such an arrangement that, when the cleaner element unit Ue is pulled off the intake passage 17, for example, in order to carry out maintenance such as replacement or cleaning of the cleaner element unit Ue, the seal packing 368 is not unintentionally detached from the intake passage 17 while sticking to the cleaner element unit Ue. Assembly of the seal packing 368 to the intake passage 17 will therefore not be forgotten, and the seal packing 368 will not be lost.

Embodiments of the present invention have been described above, but the present invention is not limited to these embodiments, and various embodiments are possible within the scope of the present invention.

For example, in the above-mentioned embodiments, the cleaner cover body of the air cleaner is formed from the upper cover body and the lower cover body as separate structures, but they may be formed as a unit. Further, the cleaner cover body may be formed from the upper cover body alone, and in this case its lower open face may be closed by a base wall. Furthermore, in the above-mentioned embodiments, a case in which the connecting bolt is used as the securing member has been described, but another securing member having the same effect may be used instead of the connecting bolt.

The invention claimed is:

1. An engine air cleaner comprising:

a cleaner cover body provided with a suction opening communicating with outside air and a discharge opening communicating with an intake port of an engine, and a cleaner element unit for cleaning the outside air sucked in via the suction opening, the cleaner element unit being housed within the cleaner cover body, wherein a skirt wall of the cleaner cover body surrounding the suction opening in the vicinity of the suction opening extends further downward than the suction opening.

2. The engine air cleaner according to claim 1, wherein a shielding wall is provided between the suction opening and the skirt wall, the skirt wall and the shielding wall facing each other across a gap and forming a double wall that extends further downward than the suction opening.

3. The engine air cleaner according to claim 1, wherein the shielding wall is provided along an outer open edge of the suction opening as to be arranged side by side with the skirt wall, extends in a direction away from the suction opening, and is curved to cover the suction opening from opposite sides.

4. The engine air cleaner according to claim 1, wherein the suction opening has a widening portion that widens relative to a center of the suction opening toward the middle of the cleaner cover body, an intake tube extending upward toward the interior of the cleaner cover body is connected integrally to the suction opening, and the intake tube is gradually narrowed from an entrance on the suction opening side to an exit at the upper end of the intake tube.

5. An engine air cleaner comprising:

a cleaner cover body provided with a suction opening communicating with outside air and a discharge opening communicating with an intake port of an engine, and a cleaner element unit for cleaning the outside air sucked in via the suction opening, the cleaner element unit being housed within the cleaner cover body, wherein an intake passage is provided within the cleaner cover body, the intake passage providing communication between the suction opening and the discharge opening provided in the cleaner cover body;

a seal packing and the cleaner element unit are superimposed and fitted onto an outer periphery of the intake passage;

outside air taken in through the suction opening is cleaned by the cleaner element unit and then discharged into the discharge opening;

the seal packing preventing outside air from leaking directly to the discharge opening; and the seal packing is provided with a retaining member that is tightly engaged with the cleaner cover body so ac to prevent the seal packing from being unintentionally detached from the intake passage.

6. An engine air cleaner comprising:

a cleaner cover body provided with a suction opening communicating with outside air and a discharge opening communicating with an intake port of an engine, and a cleaner element unit for cleaning the outside air sucked in via the suction opening, the cleaner element unit being housed within the cleaner cover body, wherein the cleaner cover body is formed from an upper cover body and a lower cover body fixed to a lower part of the upper cover body;

an intake passage is provided in a dividing wall provided on the lower cover body, the intake passage providing communication between the suction opening provided in the upper cover body and the discharge opening provided in the lower cover body;

a seal packing and the cleaner element unit are superimposed and fitted onto an outer periphery of the intake passage;

outside air taken in through the suction opening is cleaned by the cleaner element unit and then discharged into the discharge opening, the seal packing being held between the cleaner element unit and the dividing wall to prevent outside air from leaking directly to the discharge opening; and the seal packing is provided with a retaining member that is tightly engaged with the lower cover body to prevent the seal packing from being unintentionally detached from the intake passage.

7. The engine air cleaner according to claim 5, wherein the retaining member of the seal packing is tightly engaged with the outer periphery of the intake passage.

8. The engine air cleaner according to claim 6, wherein the retaining member of the seal packing is tightly engaged with a channel formed in the dividing wall.

9. The engine air cleaner according to claim 5, wherein the retaining member is formed on a face other than a seal face of the seal packing.

10. A device for mounting, on an engine, an engine air cleaner comprising:

a cleaner cover body provided with a suction opening communicating with outside air and a discharge opening communicating with an intake port of an engine, and a cleaner element unit for cleaning the outside air sucked in via the suction opening, the cleaner element unit being housed within the cleaner cover body, wherein the air cleaner is disposed to be side by side with one side of the engine;

a lower part of the cleaner cover body forming an outer shell of the air cleaner is joined integrally to and supported on the engine together with a carburetor via a pair of securing members; and a reinforcing vertical wall portion of the cleaner cover body facing the engine across a gap is joined integrally to and supported on the engine via another securing member.

11. A device for mounting, on an engine, an engine air cleaner comprising:

a cleaner cover body provided with a suction opening communicating with outside air and a discharge opening communicating with an intake port of an engine, and a cleaner element unit for cleaning the outside air sucked in via the suction opening, the cleaner element unit being housed within the cleaner cover body, wherein the air cleaner is disposed to be side by side with one side of the engine;

the cleaner cover body forming an outer shell of the air cleaner is formed by integrally connecting an upper cover and a lower cover body, the cleaner element unit for cleaning outside air that has been fed in being disposed in the upper cover and the lower cover body forming an intake duct for guiding cleaned outside air to the engine;

a dividing wall is formed integrally with an upper face of the lower cover body, the dividing wall dividing the upper cover body and the lower cover body and reinforcing an upper part of the lower cover body;

the lower cover body has its lower part joined integrally to and supported on the engine together with a carburetor via a pair of securing members; and a reinforcing vertical wall portion, in the vicinity of the dividing wall, of an upper part of the lower cover body is joined integrally to and supported on the engine via another securing member.

12. The device for mounting on an engine an engine air cleaner according to claim 11, wherein a boss having a hollow cylindrical hole extending toward the engine is formed integrally with the reinforcing vertical wall portion of the lower cover body; and said other securing member fixed to the engine runs through and is fixed to the hollow cylindrical hole of the lower cover body.

13. The device for mounting on an engine an engine air cleaner according to claim 10, wherein all of said pair of securing members and said other securing member are connecting bolts, their central axes are substantially parallel to each other, and all of these connecting bolts can be operated from outside the cleaner cover body.

* * * * *